United States Patent
Xiang (10) Patent No.: US 8,045,657 B2
(45) Date of Patent: Oct. 25, 2011

(54) ENHANCED CARRIER FREQUENCY OFFSET ESTIMATOR

(75) Inventor: Weidong Xiang, Canton, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 558 days.

(21) Appl. No.: 12/239,042

(22) Filed: Sep. 26, 2008

(65) Prior Publication Data

US 2009/0080576 A1 Mar. 26, 2009

Related U.S. Application Data

(60) Provisional application No. 60/995,491, filed on Sep. 26, 2007.

(51) Int. Cl.
*H04L 27/06* (2006.01)
(52) U.S. Cl. ........ 375/344; 375/316; 375/260; 375/362; 375/364; 375/365; 375/366; 375/368
(58) Field of Classification Search .................. 375/344, 375/316, 260, 362, 364, 366, 368
See application file for complete search history.

(56) References Cited

U.S. PATENT DOCUMENTS

| | | | |
|---|---|---|---|
| 6,882,691 B2 | 4/2005 | Chiodini | |
| 7,257,102 B2 | 8/2007 | Min et al. | |
| 7,826,567 B2 * | 11/2010 | Gruijters et al. | 375/343 |
| 2004/0005018 A1 * | 1/2004 | Zhu et al. | 375/340 |
| 2007/0140212 A1 * | 6/2007 | Gaikwad et al. | 370/350 |
| 2009/0168641 A1 * | 7/2009 | Kao et al. | 370/208 |
| 2010/0316175 A1 * | 12/2010 | Zeng et al. | 375/360 |

OTHER PUBLICATIONS

Paul H. Moose, "A Technique for Orthogonal Frequency Division Multiplexing Frequency Offset Correction", IEEE Transactions on Communications, vol. 42, No. 10, Oct. 1994. pp. 2908-2914.
M. Morelli et al., "An Improved Frequency Offset Estimator for OFDM Applications", IEEE Communications Letters, vol. 3, No. 3, Mar. 1999. pp. 75-77.
T. Schmidl et al. "Robust Frequency and Timing Synchronization for OFDM", IEEE Transactions on Communications, vol. 45, No. 12, Dec. 1997. pp. 1613-1621.

* cited by examiner

*Primary Examiner* — Chieh M Fan
*Assistant Examiner* — Siu Lee
(74) *Attorney, Agent, or Firm* — Harness, Dickey & Pierce, P.L.C.

(57) ABSTRACT

A method is provided for estimating a frequency offset in a carrier signal caused by the Doppler effect. The method determines a frequency offset estimate by utilizing a multi stage estimation scheme. More specifically, the method determines the frequency offset estimate of a data frame by iteratively estimating the frequency offset by comparing different portions of the preamble. As the length of the sampled patterns varies, the frequency offset estimates vary in accuracy and range. The method may adjust frequency offset estimates that are out of range. Finally, the receiver obtains a frequency offset estimate for the data frame from a weighted combination of frequency offset estimates. This method is applicable in WiFi (IEEE 802.11a/g), WiMax (IEEE 802.16), and WAVE (IEEE 802.11p) systems.

20 Claims, 5 Drawing Sheets

ENHANCED CARRIER FREQUENCY OFFSET ESTIMATOR

CROSS-REFERENCE TO RELATED APPLICATIONS

This application claims the benefit of U.S. Provisional Application No. 60/995,491, filed on Sep. 26, 2007. The entire disclosure of the above application is incorporated herein by reference.

FIELD

The present disclosure relates to a technique for determining a carrier frequency offset in a wireless communication system.

BACKGROUND

Orthogonal frequency-division multiplexing (OFDM) is a frequency domain multiplexing (FDM) scheme that uses multiple sub-carriers to deliver information in parallel in a frequency domain. In OFDM, a large number of closely-spaced orthogonal sub-carriers are used to carry data. The carriers are spaced apart in predetermined frequencies, which results in the orthogonality between carriers.

OFDM has been thought of as an attractive solution to high data-rate wireless transmission. This is mainly due to its parallel transmission mechanism in order to conform to a bandwidth-limited wireless channel. On the other hand, OFDM systems are more sensitive to frequency offset than single carrier system because frequency offsets can lead to the loss of orthogonality between the sub-carriers and, consequently, introduce inter-carrier interference (ICI). Methods to detect and compensate the frequency offset are always an area of concern in OFDM studies.

In detecting and compensating the frequency offset there are three principle concerns, accuracy, range, and complexity. Accuracy refers methods ability to correctly determine the carrier frequency offset. Range is typically normalized by the sub-carrier spacing, namely the maximum and minimum offset amounts for which the method can calculate an offset. For example, a method that is ±0.5 can only estimate an offset less than or equal to one half a sub-carrier spacing. Finally, complexity refers to the resources required to determine an offset. If a method is too complex, then too many resources or too much time is required to determine a frequency offset. In the later situation, a frequency offset that cannot be computed in adequate time is useless.

The following methods have been presented to estimate carrier offset. Moose presented a maximal likelihood estimation method for burst transmission OFDM systems in P. H. Moose, "A technique for orthogonal frequency division multiplexing frequency offset correction," IEEE Trans. Commun., vol. 42, pp 2908-2914, October 1994, which is incorporated by reference herein. It compares two consecutive identical OFDM symbols to extract the phase rotation caused by frequency offset and the estimated range can reach ±0.5 sub-carrier spacing. Based on this, Schmidl et al adopts two identical halves within one OFDM symbol and extends estimate range to ±1 sub-carrier spacing but with less accuracy than Moose. T. M. Schmidl and D. C. Cox, "Robust frequency and timing synchronization for OFDM," IEEE Trans. Commun., vol. 45, pp. 1613-1621. Morelli introduces a multistage estimate scheme with improved accuracy at the cost of increased computation. M. Morelli and U. Mengalli, "An improved frequency estimator for OFDM applications," *IEEE Communications Letters*, vol. 3, pp. 75-77. Morelli's large increase in complexity prevents it from being commercially feasible in the real systems.

One significant contributor to frequency offset is the Doppler effect. Frequency offsets caused by a Doppler shift leads to the loss of orthogonality between sub-carriers, resulting in ICI. As the Doppler effect is a function of the velocity of the receiver as it moves relative to the transmitter, the effect of Doppler shifts will become more prevalent as wireless OFDM receivers become more mobile. As wireless receivers become increasingly mobile, the demand for an accurate, efficient, and cost-effective method of estimating frequency offset will become apparent.

The majority of the current offset estimation methods assume little or no mobility of the receiver. As focuses shift to mobile vehicular communication, however, new methods are needed to deal with Doppler shifts and the effects of waves bouncing off other vehicles or objects.

In this disclosure, a wide range estimator is presented with satisfied accurate and tolerable computation for OFDM systems based on Institute of Electrical and Electronics Engineers (IEEE) 802.IIa/g, IEEE 802.11p and IEEE 802.16 standards. IEEE 802.11a/g, IEEE 802.11p and 802.16 are herein incorporated by reference.

This section provides background information related to the present disclosure which is not necessarily prior art.

SUMMARY

A method is provided for estimating a frequency offset estimate in a wireless communications system. The method includes: receiving a transmitted data frame having a repeated preamble pattern; generating a first stage frequency offset estimate by comparing a preamble pattern from the data frame having a first length with another preamble pattern from the data frame having the first length wherein the two preamble patterns do not overlap; generating a second stage frequency offset estimate by comparing a preamble pattern having a second length less than the first length with another preamble pattern having the second length wherein the two preamble patterns do not overlap; and generating the frequency offset estimate as a weighted combination of the first stage frequency offset estimate and the second stage frequency offset estimate.

Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Typically, base band signal processing consists of three cascaded stages. The stages are time synchronization, frequency synchronization, and demodulation. The frequency synchronization stage consists of estimating a frequency offset of the transmitted signal, and correcting the signal using the estimated frequency offset.

Figure 1:
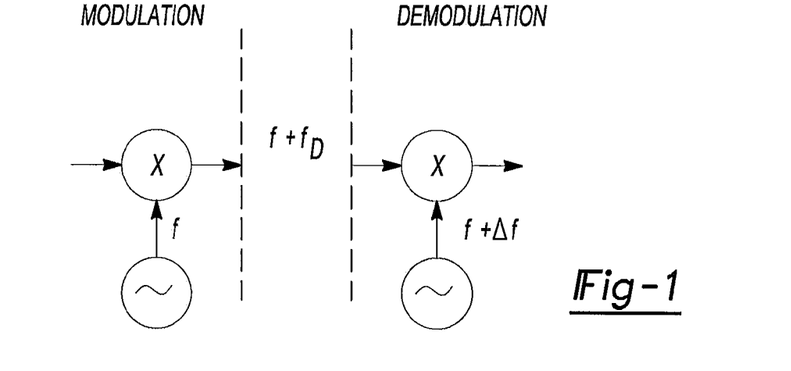
FIG. 1 is a diagram illustrating a frequency offset in a transmission.

Referring now to FIG. 1. In an orthogonal frequency divisional multiplexing (OFDM) transmission, a transmitter transmits a radio frequency (RF) signal comprised of multiple offset sub-carriers. As the signal is transmitted, the frequency will become offset in the amount $f_D$. At the receiver end, the demodulator demodulates the signal that will generate frequency offset $\Delta f$. The following disclosure presents a method for quickly and accurately determining ($\Delta f + f_D$) within an acceptable sub-carrier spacing range.

A receiver receives a signal having a plurality of data frames. Within each data frame there is plurality of repeated preamble stream patterns. The disclosed method uses the repeating patterns to determine an estimate for the frequency offset. The proposed method iteratively estimates the frequency offset by comparing different portions of the preamble. As the length of the sampled patterns varies, the frequency offset estimates vary in accuracy and range. One iteration may treat the first half of the preamble patterns as a single preamble pattern and the second half of the preamble pattern as a second pattern to obtain a frequency offset estimate having high accuracy, but only a small frequency range where the offset is detectable. A second iteration may determine a frequency offset estimate by determining the offset between a first pattern and a second pattern, a third pattern and a fourth pattern, etc., and determine an estimate based on how the frequency is offset between adjoining patterns. This provides a greater range, but at the cost of accuracy. The method then adjusts frequency offset estimates that may be out of range. Finally, by using predetermined combine coefficients, the receiver may obtain a weighted combination of frequency offset estimates, which is the frequency offset estimate for the data frame.

Figure 2:
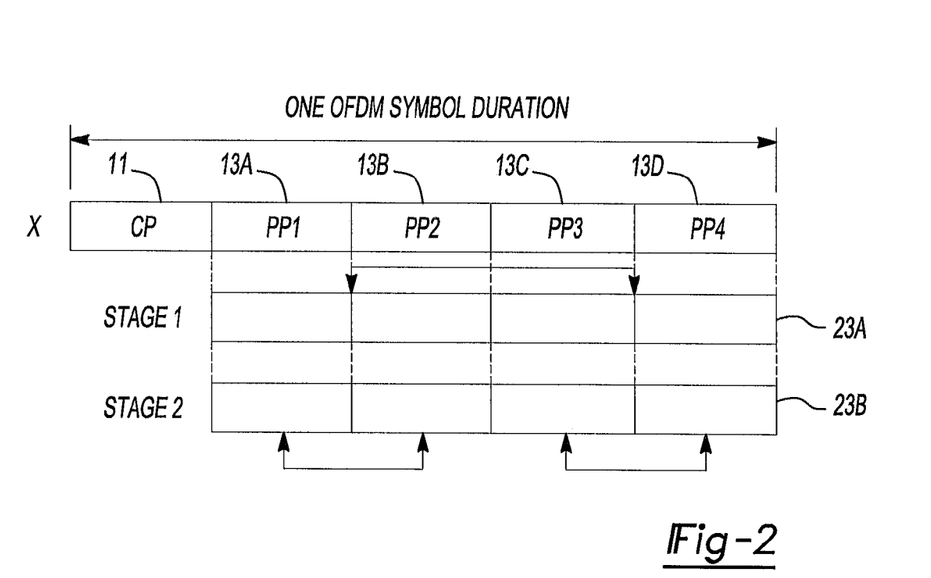
FIG. 2 is a diagram illustrating the configuration of short preamble defined by the IEEE 802.16 standard.

Referring now to FIG. 2. A first portion of a preamble in an OFDM frame, referred to as a short preamble, is included in a data frame to provide for a time and frequency synchronization and consists of several repeated identical patterns. FIG. 2 shows the configuration of short preamble defined by IEEE 802.16 standard. The short preamble consists of one complete OFDM symbol 11 and 13A-D. Both the CP 11 and the repeated PP13 A-D are 64-sample patterns. Considering actual channel delay spread due to multipath fading and time synchronization offset, the proposed estimator bypasses the CP portion 11 and estimates a frequency offset from the repeated PPs 13A-D. The cascading scheme 23A and 23B presented below enhances both the frequency offset estimate accuracy and range.

After removing the CP 11, the rest of the short preamble 13A-D consists of L repeated patterns. Assume that the estimator has n stage estimators, where $n = \log_2 L$. The proposed n stage estimator is expressed as the following:

$$\hat{\varepsilon} = \sum_{i=1}^{n} \Lambda(\hat{\varepsilon}_i)\alpha_i \qquad (2.1)$$

$$\text{In which, } \hat{\varepsilon}_i = \frac{2^{i-1}}{\pi} \text{angle}\left( \sum_{i=0}^{2^{i-1}-1} \sum_{k=(N/2^{i-1})}^{N/2^i-1} x_k^2 x_{k+N/2} \right) \qquad (2.2)$$

$$\sum_{i=1}^{n} \alpha_i = 1 \qquad (2.3)$$

$$\Lambda(\hat{\varepsilon}_i) = \begin{cases} \hat{\varepsilon}_i & \text{if } i = n \\ \hat{\varepsilon}_i + j2^i & \text{others} \end{cases} \qquad (2.4)$$

$$j = \underset{k}{\operatorname{argmin}} |\hat{\varepsilon}_n - (\hat{\varepsilon}_i + k2^i)| \,|\, k = 0, \pm 1, \ldots \pm 2^{n-i-1} \qquad (2.5)$$

Referring to equations (2.1-2.5), $\hat{\varepsilon}$ and $\hat{\varepsilon}_i$ are the total and i-th stage frequency offset estimates respectively, normalized by a sub-carrier spacing. Equation (2.1) is used for obtaining the i-th stage frequency offset estimate, where N is equal to an FFT block size, $\chi_k$, is the k-th received complex sample of the short preamble and $\chi_k^*$ is its conjugate. This particular method is known in the art as the maximum likelihood estimation method. Other methods of calculating a frequency offset, or a stage frequency offset, such as a Periodagram, are also feasible within the disclosed framework. The index of the first sample of PP1 13A is initialized to zero.

Referring now to equations (2.4) and (2.5), $\Lambda(\hat{\varepsilon}_i)$ is an adjustment function to recover the correct frequency offset according to the results of the stage estimators 23 A-C. The adjustment function 25 A and B corrects a frequency offset estimate when the estimate is outside of the sub-carrier range of a particular stage level. Note that the adjustment function does not adjust the final stage estimator (i.e. when i=n) because the range of the final stage estimator is the outer range of the estimator.

Referring now to equations (2.1) and (2.3), $\alpha_i$ is a combine coefficient defined in equation (2.3). A combine coefficient, $\alpha_i$, is used to weight 27 A-C the i-th stage frequency offset estimate in correlation to the accuracy of the i-th stage estimator. As shown in equation (2.1), $\alpha_i$ does not limit $\hat{\varepsilon}_i$, but rather $\alpha_i$ limits $\Lambda(\hat{\varepsilon}_i)$.

As discussed above, after each stage estimator 23A-C generates a result, a series of combine coefficients is selected to weight the results of the stage estimators 23 A-C to obtain the best combined estimate. As shown in equation (2.3), the sum of the combine coefficients equals one. The best linear unbiased estimator method can be used to determine the combine coefficients, the details of which are described below.

For an IEEE 802.16 standard based OFDM system, the short preamble consists of five patterns and covers the duration of one OFDM symbols. As discussed above, the first prefix is the CP 11 and the PPs 13 A-D are the remaining four prefixes. Thus, L=4 and n=2. The variances of a two stage estimator are given by Moose and Schmidl et al, such that: $D(\hat{\varepsilon}_1) = 2/(\pi^2 N\gamma)$, $D(\hat{\varepsilon}_2) = 8/(\pi^2 N\gamma)$, of which $\gamma$ represents signal to noise ratio. The variance of the combined estimate $\hat{\varepsilon}$ is given by $D(\hat{\varepsilon}) = \alpha_1^2 D(\hat{\varepsilon}_1) + (1-\alpha_1)^2 D(\hat{\varepsilon}_2)$. Considering these three equations, one can determine the optimal combine coefficients when the variance of the combined estimate reaches its minimum value. In a two stage estimator, the optimal combine coefficients are $\alpha_1 = 4/5$, $\alpha_2 = 1/5$. The resulting variance is defined as:

$$D(\hat{\varepsilon}) = \frac{8}{5} \frac{1}{\pi^2 N \gamma} \quad (2.6)$$

Figure 3:
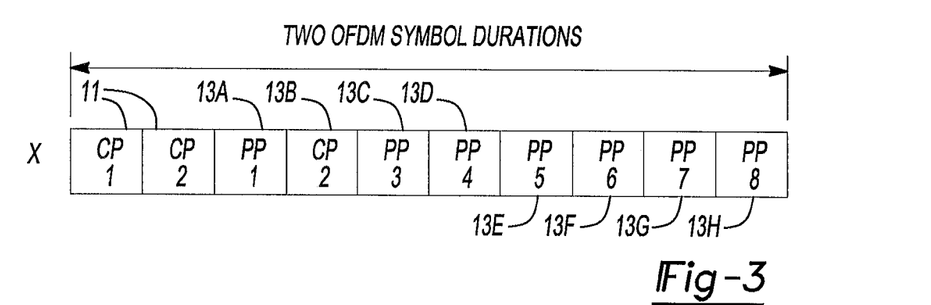
FIG. 3 is a diagram illustrating the configuration of short preamble defined by the IEEE 802.11 standard.

For IEEE 802.11a/g and IEEE 802.11p standard based OFDM systems, the short preamble consists of ten repeated 16-sample patterns and covers the duration of two OFDM symbols, shown in FIG. 3. Treating the first two identical sample patterns as two cyclic prefixes 11, there remain eight PPs 13 A-H, and thus, n=3. Similarly, the variances of three stage estimators are listed as, $D(\hat{\varepsilon}_1)=1/(4\pi^2 N\gamma)$, $D(\hat{\varepsilon}_2)=1/(\pi^2 N\gamma)$, $D(\hat{\varepsilon}_3)=4/(\pi^2 N\gamma)$. And the optimal combine coefficients are $\alpha_1=16/21$, $\alpha_2=4/21$, $\alpha_3=1/21$. The resulting variance of a three stage estimator is:

$$D(\hat{\varepsilon}) = \frac{84}{441} \frac{1}{\pi^2 N \gamma} \quad (2.8)$$

Figure 4:
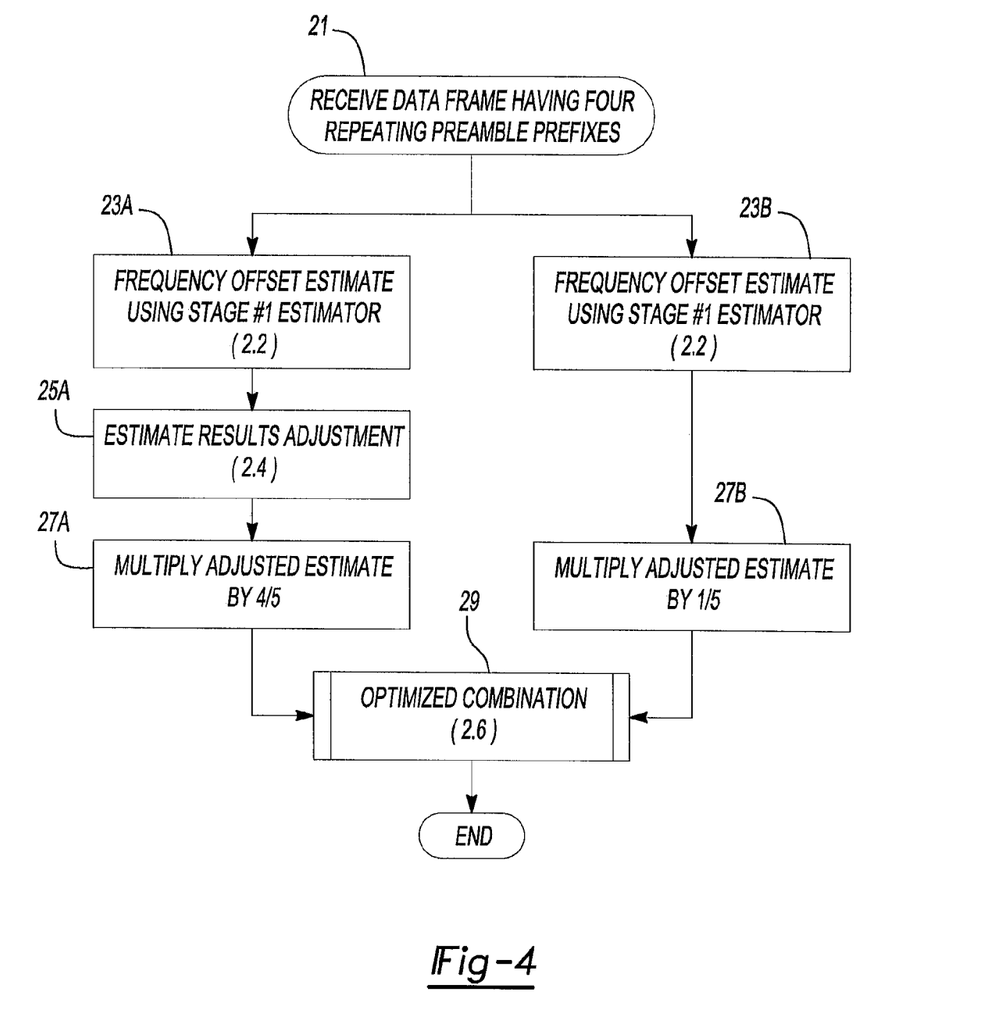
FIG. 4 is a flow diagram of a two stage estimator.

Referring now to FIG. 4. The following embodiment discloses a two-stage cascade estimator. In this embodiment, the method estimates the frequency offset from a short preamble having four repeated PPs 13A-D. Accordingly, n=2, as L=4 and L=2ⁿ. Thus, the present embodiment utilizes a two stage estimator, each stage estimator 23A and B having a different estimate accuracy and range. In this embodiment, each stage level estimator 23A and B utilizes the maximum likelihood estimation method, equation (2.2), to generate a stage level frequency offset estimate. The first stage estimator 23A compares (PP1+PP2) with (PP3+PP4) in an estimate range of ±0.5 sub-carrier spacing. The second stage estimator 23B simultaneously compares PP1 with PP2 and PP3 with PP4 in the estimate range of ±1 sub-carrier spacing, resulting in a less accurate estimation but over a greater estimate range. The resulting stage estimates are adjusted by the adjustment function 25A (noting that the adjustment function does not actually adjust the stage 2 offset estimation) and multiplied or weighted 27A and B by their respective combine coefficients, $a_1=4/5$ and $a_2=1/5$. Finally, the two adjusted and weighted stage level estimations are combined 29 to acquire both a wide estimate range and an improved estimate accuracy. The resulting offset estimate is used to compensate for the transmitted data frame.

Figure 5:
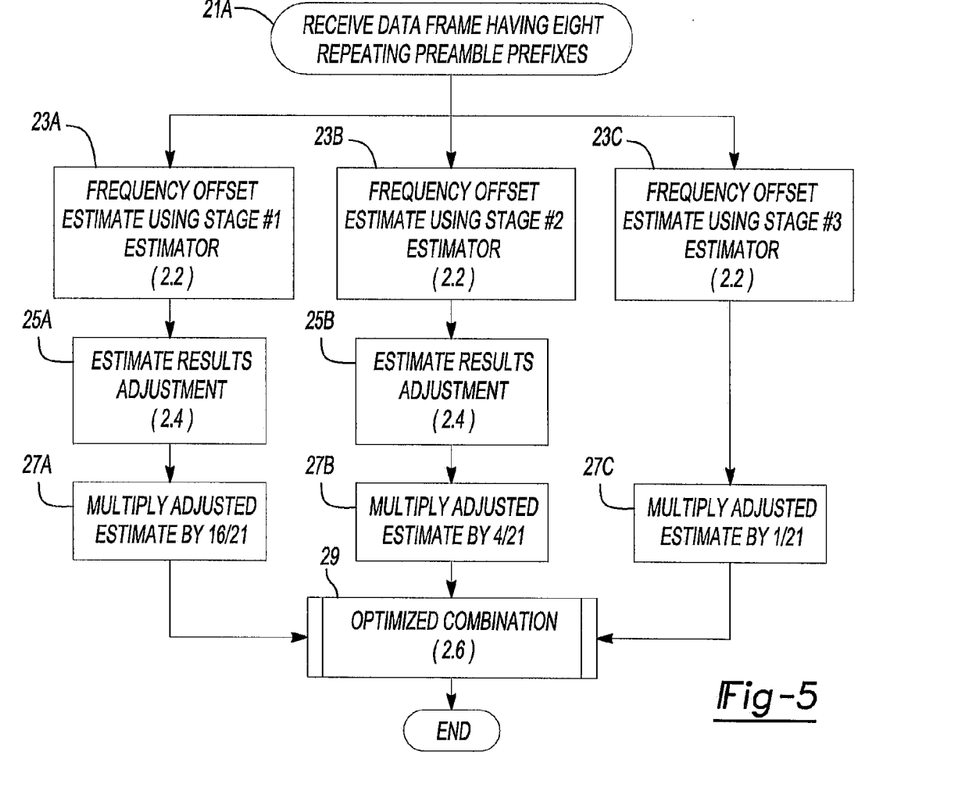
FIG. 5 is a flow diagram of a three stage estimator.

Referring now to FIG. 5. The following embodiment describes a three-stage cascade estimator. In this embodiment, the estimator estimates the frequency offset from a preamble having two durations and eight PPs 13A-H. Accordingly, n=3, as L is 8 and L=2ⁿ. Similar to a two stage estimator, a three stage estimator may implement a maximum likelihood estimation method, equation (2.2), or a Periodogram to estimate the stage level frequency offset estimations. The first stage estimator 23A compares (PP1+PP2+PP3+PP4) with (PP5+PP6+PP7+PP8) in an estimate range of ±0.5 sub-carrier spacing. The second stage estimator 23B simultaneously compares (PP1+PP2) with (PP3+PP4) and (PP5+PP6) with (PP7+PP8) in an estimate range of ±1 sub-carrier spacing. The third stage estimator 23C compares PP1 with PP2, PP3 with PP4, PP5 with PP6, and PP7 with PP8 in an estimate range of ±2.0 sub-carrier spacing. The adjustment function 25A and B adjusts the resulting stage estimates (noting again that the adjustment function will not adjust the third stage estimator). The adjusted stage frequency offsets are multiplied or weighted 27A-C by their respective combine coefficients, $a_1=16/21$, $a_2=4/21$ and $a_3=1/21$. The estimated frequency offset is obtained by summing the three resulting weighted and adjusted estimates. The estimated frequency offset is used to compensate for the preamble's corresponding data frame.

Figure 9:
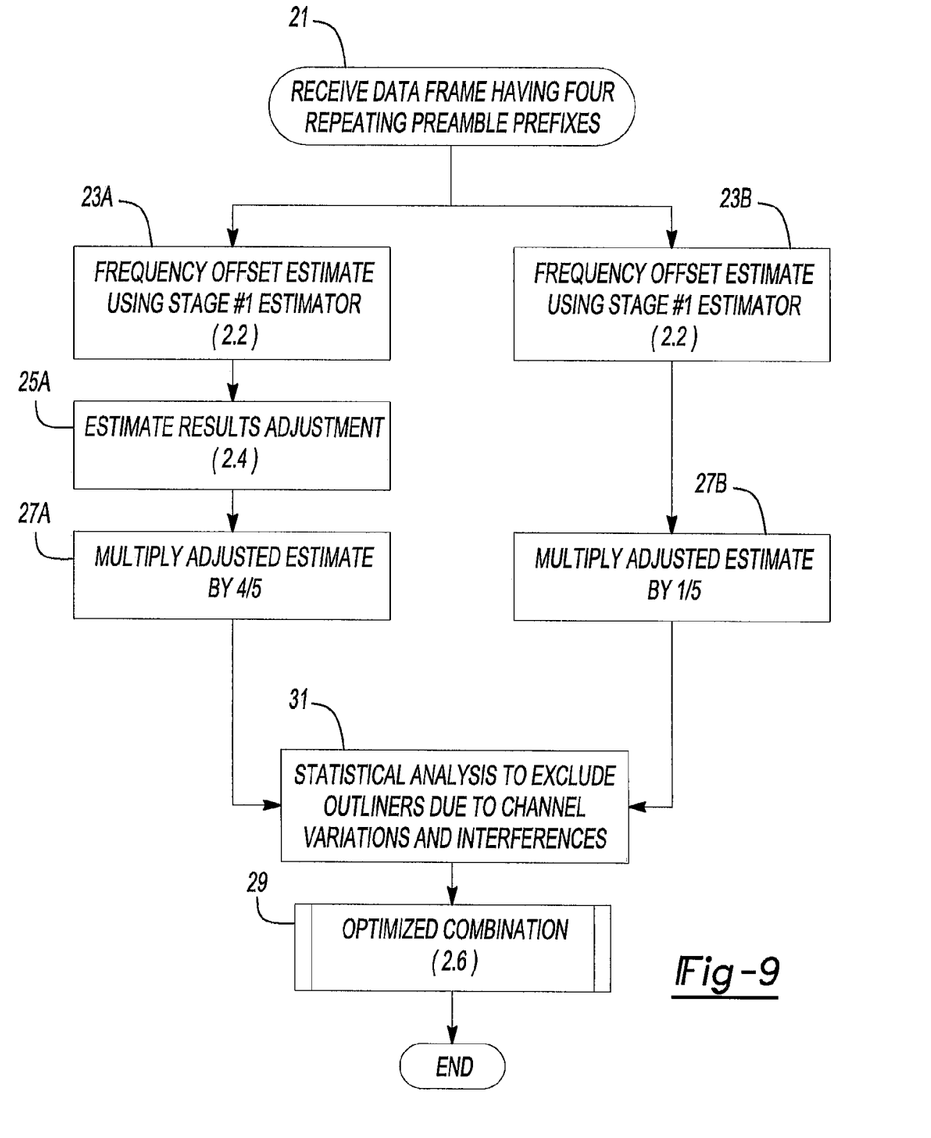
FIG. 9 illustrates an outlier detection mechanism within the framework of a two stage estimator.

Referring now to FIG. 9. It is important to note that either a variation of channel or unexpected interference occurring during the preamble duration will cause an erroneous output of frequency offset estimate. This is referred to as an outlier. Using multiple stage estimators 23 A and B, outliers may be eliminated by using the statistic characteristics of the outputs from multiple stages 23 A and B to detect outliers 31. The outlier may be detected because it does not confirm with a normal distribution centralized at the true frequency offset. Once an outlier has been identified, it will be excluded from the calculation of the frequency offset estimate. Alternative embodiments may use this detection mechanism 31 to avoid malfunction of the frequency offset estimate. For example, an estimate, of which the differences between the other two estimates are two times larger than the difference between the other two estimates can be classified as a outlier.

While the technique described above relied upon the cyclic prefix and the repeated preamble pattern, it is understood that this technique is applicable to any repeated pattern found in a data frame.

One can compare the proposed estimator's results to those of an ideal estimator in order to evaluate the performance of the proposed cascade estimator. This comparison presumes that the frequency offset will be within ±0.5 sub-carrier spacing. In other words, the theoretical ideal estimator consists of two first stage estimators 23 A, rather than one first stage estimator 23A and one second stage estimator 23 B because the second stage estimator 23B provides a widened estimate range at the cost of accuracy. The estimate variance of an ideal estimator reaches Cramer-Rao boundary (CRB), given by the following equation:

$$CRB(\hat{\varepsilon}) = \frac{1}{\pi^2 N \gamma} \quad (2.7)$$

Thus, the variance of the proposed two stage estimator is about 2 dB degradation to this theoretical boundary.

Similarly, the variance of the proposed three stage cascade estimator is about 3.6 dB degradation to the CRB, as presented in the following equation:

$$CRB(\hat{\varepsilon}) = \frac{1}{12\pi^2 N \gamma} \quad (2.9)$$

To verify the effectiveness of the proposed cascade estimator, a simulation program was built. The Rayleigh fading model with an exponential decay power profile was employed, of which the RMS of each tap weight characterizes the specific channel. The sampled channel impulse response, $h_k = h(t)|_{t=kT_s}$, was given as, $$h_k = N\left(0, \frac{1}{2}\sigma_k^2\right) + jN\left(0, \frac{1}{2}\sigma_k^2\right) \quad (2.10)$$

$$\sigma_k^2 = (1 - e^{-T_s/T_{rms}})e^{-kT_s/T_{rms}} \quad (2.11)$$

where $T_s$ is the sampling period and $T_{rms}$ is the RMS power average of the taps.

$$N\left(0, \frac{1}{2}\sigma\frac{2}{k}\right)$$

is normal distribution with zero mean and the variance of $$\frac{1}{2}\sigma\frac{2}{k}.$$

Figure 6:
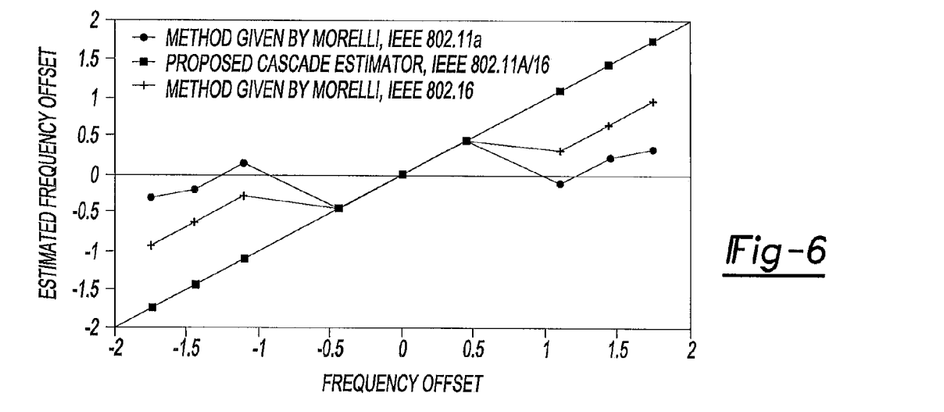
FIG. 6 is a graph illustrating the estimated range of the proposed cascade estimator in relation to the known estimation techniques.

$T_{rms}/T_s$ was set at 3.2 and the total number of taps was set at 32. 1000 runs were executed for each simulation value. FIG. 6 demonstrates that the proposed cascade estimator can generate the correct estimate during the frequency offset range of ±2 sub-carrier spacing while the method presented in Morelli et al fails within the offset range of <−0.5 or >0.5 sub-carrier spacing.

Figure 7:
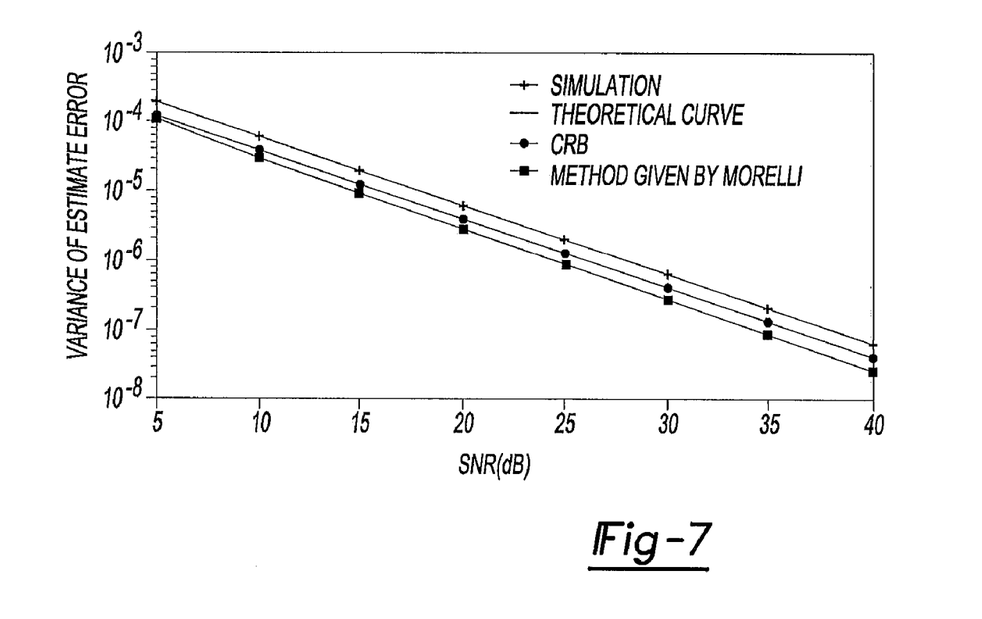
FIGS. 7 and 8 are graphs illustrating simulation results of OFDM systems based on the IEEE82.16 and IEEE 802.11a standards, respectively.
Figure 8:
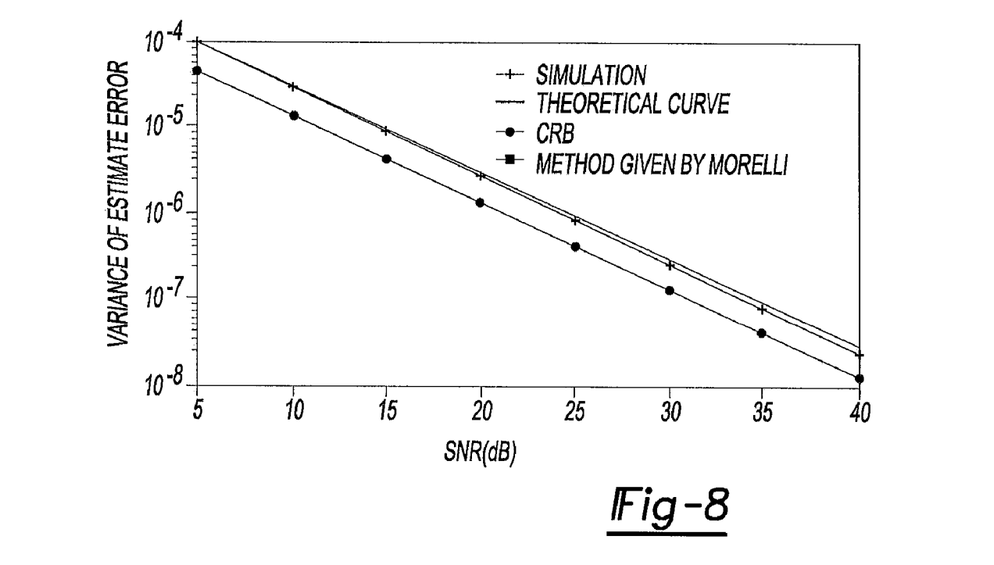

The simulation results match the analysis expressions given by (2.6) and (2.8), which is illustrated in FIGS. 7 and 8 for OFDM systems based on the IEEE 802.16 and IEEE 802.11a standards, respectively. Meanwhile, the ideal theoretical boundary as well as estimate variance of the method given by Morelli is also plotted as references.

Referring now to FIGS. 8 and 9. From FIG. 8, one can see that the method presented in Morelli et al provides a similar result than the proposed method and the CRB, but with half the range and 125% the complexity. In FIG. 9, Morelli's method and the proposed method have an equivalent estimate accuracy. At the same time, the computational complexity of the method presented is 60% less than that of Morelli and the estimate range is four times wider.

An optimal solution to detect the carrier frequency offset for OFDM systems based on IEEE 802.16 and IEEE 802.11a/g and 802.11p standards is presented. IEEE 802.11p, wireless access for vehicular environment (WAVE), could be regarded as an extension of the IEEE 802.11a/g standards based wireless local area networks from an indoor environment to a vehicular environment. WAVE systems operate in 5.850-5.925 GHz frequency band assigned by the FCC. The advanced orthogonal frequency-division multiplexing (OFDM) modulation is adopted by WAVE systems to achieve high-speed data rates up to 6-27 Mbs/s. Mesh network configuration proposed for WAVE systems minimizes transmission latencies. These features make the WAVE system an attracting physical layer scheme for intelligent transportation systems. Although not limited thereto, the technique described above is particularly suitable for WAVE systems. The framework, however, is well suited for all mobile wireless receivers. The above description is merely exemplary in nature and is not intended to limit the present disclosure, application, or uses.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The invention claimed is:

1. A method for estimating a frequency offset estimate in a wireless communications system, comprising:
    receiving a transmitted data frame having a repeatable preamble pattern;
    generating a first stage frequency offset estimate by comparing a preamble pattern from the data frame having a first length with another preamble pattern from the data frame having the first length wherein the two preamble patterns having the first length do not overlap;
    generating a second stage frequency offset estimate by comparing a preamble pattern from the data frame having a second length less than the first length with another preamble pattern from the data frame having the second length wherein the two preamble patterns having the second length do not overlap;
    generating the frequency offset estimate by determining a weighted combination of the first stage frequency offset estimate and the second stage frequency offset estimate; and
    synchronizing the transmitted data frame using the frequency offset estimate.

2. The method of claim 1 further comprises generating the frequency offset estimate by multiplying the first stage frequency offset estimate by a first combine coefficient and multiplying the second stage frequency offset estimate by a second combine coefficient, where the combine coefficients are determined by determining a variance for each of the stage frequency offset estimates and using a best linear unbiased estimator with said variances as parameters to determine the combine coefficients.

3. The method of claim 2 wherein the first combine coefficient is equal to 4/5 and the second combine coefficient is equal to 1/5.

4. The method of claim 1 further comprising using a maximum likelihood estimation method to generate the first stage frequency offset estimate and the second stage frequency offset estimate.

5. The method of claim 1 further comprising using a Periodogram to generate the first stage frequency offset estimate and the second stage frequency offset estimate.

6. The method of claim 1 further comprising generating an adjusted first stage frequency offset estimate by adjusting the first stage frequency offset estimate using an adjustment function.

7. The method of claim 1 wherein comparing a preamble having a first length and another preamble pattern having a first length further comprises the preamble patterns being consecutive preamble patterns.

8. The method of claim 1 wherein comparing a preamble having a second length and another preamble pattern having a second length further comprises the preamble patterns being consecutive preamble patterns.

9. The method of claim 1 wherein the method is compatible with at least one of an IEEE 802.16 wireless system, an IEEE 802.11a/g wireless system or an IEEE 802.11p wireless system.

10. The method of claim 1 further comprising using a statistical analysis to identify an existing outlier representative of a variance in channel or interference.

11. A method for determining a frequency offset estimate in a wireless communications system using a two stage estimator, comprising:
   receiving a transmitted data frame having a preamble, the preamble having at least four repeated preamble patterns;
   generating a first stage frequency offset estimate by comparing a first preamble pattern and a second preamble pattern appended together with a third preamble pattern and a fourth preamble pattern appended together using a maximum likelihood estimation method;
   generating an adjusted first stage frequency offset estimate by adjusting the first stage frequency offset estimate using an adjustment function;
   generating a weighted first stage frequency offset estimate by multiplying the adjusted first stage frequency offset by a first combine coefficient;
   generating a second stage frequency offset estimate by comparing the first preamble pattern with the second preamble pattern and comparing the third preamble pattern with the fourth preamble pattern using a maximum likelihood estimation method;
   generating a weighted second stage frequency offset estimate by multiplying the second stage frequency offset estimate by a second combine coefficient;
   generating the frequency offset estimate by adding the weighted first stage frequency offset to the weighted second stage frequency offset; and
   synchronizing the transmitted data frame using the frequency offset estimate.

12. The method of claim 11 wherein the combine coefficients are determined by determining a variance for each of the stage frequency offset estimates and using a best linear unbiased estimator with said variances as parameters to determine the combine coefficients.

13. The method of claim 11 wherein the first combine coefficient is 4/5 and the second combine coefficient is 1/5.

14. The method of claim 11 wherein the method is compatible with an IEEE 802.16 wireless OFDM system.

15. The method of claim 11 wherein generating a first stage frequency offset estimate and generating a second stage frequency offset further comprise comparing consecutive preamble patterns.

16. A method for determining a frequency offset estimate in a wireless communications system using a three stage estimator and synchronizing a frequency of a transmitted data frame, comprising:
   receiving a transmitted data frame having a preamble, the preamble having at least eight repeated preamble patterns;
   generating a first stage frequency offset estimate by comparing the first, second, third and fourth preamble patterns appended together with the fifth, sixth, seventh, and eighth preamble patterns appended together using a maximum likelihood estimation method;
   generating an adjusted first stage frequency offset estimate by adjusting the first stage frequency offset estimate using an adjustment function;
   generating a weighted first stage frequency offset estimate by multiplying the adjusted first stage frequency offset by a first combine coefficient;
   generating a second stage frequency offset estimate by comparing the first and second preamble patterns appended together with the third and fourth preamble patterns appended together, and the fifth and sixth preamble patterns appended together with the seventh and eighth preamble patterns appended together using a maximum likelihood estimation method;
   generating an adjusted second stage frequency offset estimate by adjusting the second stage frequency offset estimate using the adjustment function;
   generating a weighted second stage frequency offset estimate by multiplying the adjusted second stage frequency offset estimate by a second combine coefficient;
   generating a third stage frequency offset estimate by comparing the first preamble pattern with the second preamble pattern, the third preamble pattern with the fourth preamble pattern, the fifth preamble pattern with the sixth preamble pattern, and the seventh preamble pattern with the eighth preamble pattern using a maximum likelihood estimation method;
   generating a weighted third stage frequency offset estimator by multiplying the third stage frequency offset estimate by a third combine coefficient;
   generating the frequency offset estimate by summing the weighted first stage frequency offset estimate, the weighted second stage frequency offset estimate, and the weighted third stage frequency offset estimate; and
   synchronizing the transmitted data frame using the frequency offset estimate.

17. The method of claim 16 wherein the combine coefficients are determined by determining a variance for each of the stage frequency offset estimates and using a best linear unbiased estimator with said variances as parameters to determine the combine coefficients.

18. The method of claim 16 wherein the first combine coefficient is 16/21, the second combine coefficient is 4/21, and the third combine coefficient is 1/21.

19. The method of claim 16 wherein generating a first stage frequency offset estimate, generating a second frequency offset estimate and generating a third stage frequency offset further comprise comparing consecutive preamble patterns.

20. The method of claim 16 wherein the method is compatible with at least one of an IEEE 802.11a/g wireless system or an IEEE 802.11p wireless system.

* * * * *

UNITED STATES PATENT AND TRADEMARK OFFICE
CERTIFICATE OF CORRECTION

PATENT NO. : 8,045,657 B2  Page 1 of 1
APPLICATION NO. : 12/239042
DATED : October 25, 2011
INVENTOR(S) : Weidong Xiang It is certified that error appears in the above-identified patent and that said Letters Patent is hereby corrected as shown below:

Column 1, line 39, after "refers", insert --to--.

Column 2, line 23, "802.IIa/g" should be --802.11a/g--.

Column 3, line 23, after "demodulator", delete "the".

Column 5, line 41, "$a_1=4/5$ and $a_2=1/5$" should be --$\alpha_1=4/5$ and $\alpha_2=1/5$--.

Column 5, line 42, after "combined", delete "29".

Column 5, line 66, "$a_1=16/21$, $a_2=4/21$ and $a_3=1/21$" should be --$\alpha_1=16/21$, $\alpha_2=4/21$ and $\alpha_3=1/21$--.

Column 6, line 20, after "as", "a" should be --an--.

Column 9, line 5, Claim 3, "4/5and" should be --4/5 and--.

Column 10, line 60, Claim 19, after "second", insert --stage--.

Column 10, line 61, Claim 19, after "offset", insert --estimate--.

Signed and Sealed this
Thirty-first Day of January, 2012

David J. Kappos
*Director of the United States Patent and Trademark Office*